United States Patent [19]

Jones

[11] Patent Number: 4,536,101

[45] Date of Patent: Aug. 20, 1985

[54] CONNECTOR DEVICE

[76] Inventor: Dixon J. Jones, P.O. Box 60973, Fairbanks, Ak. 60973

[21] Appl. No.: 595,430

[22] Filed: Mar. 30, 1984

[51] Int. Cl.³ .............................................. F16B 7/00
[52] U.S. Cl. ................................. 403/389; 403/232.1; 403/399
[58] Field of Search ............... 403/400, 389, 398, 399, 403/232.1

[56] References Cited

U.S. PATENT DOCUMENTS 1,986,528  1/1935  Ranger ................................... 52/719
4,272,208  6/1981  Jones .............................. 403/232.1 X Primary Examiner—Andrew V. Kundrat
Attorney, Agent, or Firm—Gary, Juettner & Pyle

[57] ABSTRACT

A connector device for connecting a rectilinear member to a second member or surface in a spaced or overlapping relation is provided in the form of a bracket of unitary construction that is fabricated from a sheet material. The bracket or connector has an open rectilinear channel for receiving and embracing a rectilinear member, and a pair of reinforced ears at the open end for connection to a second member or surface.

9 Claims, 7 Drawing Figures

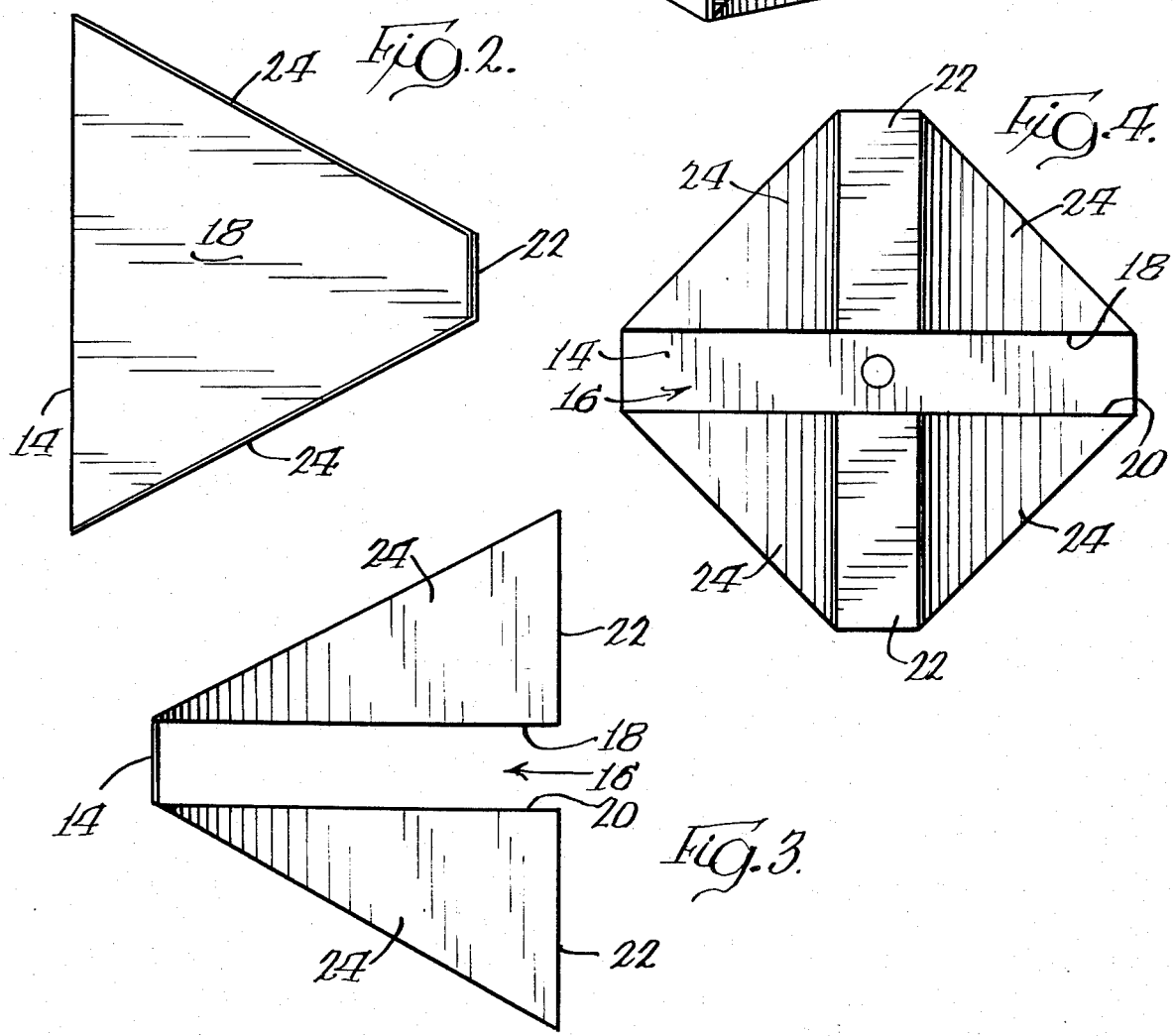

CONNECTOR DEVICE

BACKGROUND OF THE INVENTION

This invention relates to devices for providing a spaced, rigid connection between two objects and more particularly to improvements in the connector device shown and described in my U.S. Pat. No. 4,272,208, issued June 9, 1981.

The aforesaid U.S. Pat. No. 4,272,208, incorporated herein by reference, describes a connector or bracket that is particularly useful for connecting rectangular members at right angles and also in a spaced or overlapping edgewise relation, rather than nailing or connecting them directly together in a side-to-side or edge-to-side relation. One advantage of having a spaced or edge-to-edge relation between the members is to provide space for additional insulation in building construction, which is normally limited to the width of the framing members.

The bracket of the foregoing patent is in the general form of a slotted hexahedron having a pair of opposed, closed channels at right angles to each other. The members to be secured are inserted into the slots, and the bracket is then secured to the members.

While the foregoing device is very useful for its intended purpose, several drawbacks may arise. In the prior device, the bracket had to be either wrapped around the members to be joined, or the members had to be inserted lengthwise into the openings. Also, the bracket was useful in joining only two rectangular members. Because of the rather complicated and enclosed nature of the device, manufacture and shipment was difficult, and insertion of insulation into the device was difficult.

SUMMARY OF THE INVENTION

In accordance with the present invention, a connector is provided that includes a single rectangular, open-ended or C-shaped channel to receive a rectangular member in the channel. A pair of reinforced ears are provided at the open end of the channel for securement to a second member or surface. The channel and ears are part of a unitary structure wherein the ears are supported by support webs extending from the channel walls at right angles thereto.

The improved connector of the present invention is easier to install than the aforesaid prior device because of its open-ended configuration, and the improved device can join a rectangular member to any other member or surface. The interior of the connector is relatively exposed, allowing for easier insulation. The connector is easily manufactured, and the connectors can be nested in stacks for easy shipment and use.

THE DRAWINGS

FIG. 1 is a perspective view of the improved connector device of the present invention.

FIG. 2 is a plan view of the device shown in FIG. 1.

FIG. 3 is a side view of the device shown in FIG. 1.

FIG. 4 is an end view of the device shown in FIG. 1 from the open end of the device.

DESCRIPTION OF THE PREFERRED EMBODIMENT

Figure 5:
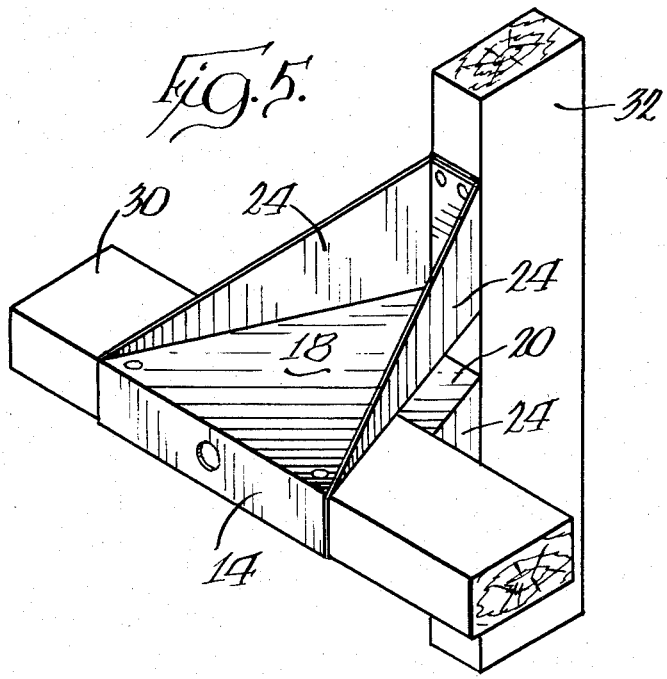
FIG. 5 is a perspective view of the device shown in FIG. 1, further illustrated the use of the device to connect a pair of rectangular members at right angles.

As shown in FIGS. 1-4, the connector device of the present invention preferably comprises a unitary structure in the form of a bracket having a general C-shaped configuration when viewed from the side (FIG. 3). To simplify description, the various parts or walls of the connector may be described as being horizontal and vertical, although obviously the bracket can be oriented and used in any position relative to horizontal.

The device as shown may be viewed as comprising two substantially identical spaced portions 10 and 12 connected at one side by a common end wall 14 and defining a rectangular channel 16 therebetween, which is open on one side remote from the end wall 14, said channel being specifically defined by the combination of said end wall and a pair of spaced parallel horizontal walls 18 and 20 extending at right angles from opposite edges of the end wall.

A pair of coplanar rectangular ears 22 are joined to and extend away from the respective horizontal walls 18 and 20 at right angles thereto at or near the open end of the channel, said ears extending in opposite directions and being substantially parallel with the end wall 14. The width of the ears 22 is preferably smaller than the width of the end wall 14, and the side edges of the horizontal walls 18 and 20 preferably converge toward the ears.

Thus, in the preferred embodiment, the horizontal walls 18 and 20 are preferably in the form of trapezoids with the side edges thereof converging toward the ears 22. In addition, reinforcing webs 24 are provided between the walls 18 and 20 are the respective ears 22 whereby to better support the ears are preferably in the form of a right triangle, with the hypotenuse extending between the outer corner of each ear to a respective corner of the end wall 14. Thus, the webs extend along and are joined to the converging side edges of the walls 18 and 20 and are also joined to the side edges of the ears 22.

FIG. 5 illustrates the connector being employed to join a pair of rectangular members 30 and 32 in a spaced or edge-to-edge relation, wherein the members are at right angles to each other. It may be seen that one of the members 30, such as a wood beam, is first inserted into the channel of the connector against the end wall and is secured thereby by suitable fasteners 34 such as nails, screws, or the like, preferably through the corners of the walls 18 and 20 above the end wall 14.

The ears 22 are secured to the second member 32 by abutting the ears against the edge of the member and then securing the ears to the member, such as by the fasteners 34 shown.

In normal building construction, the end of the member 30 would be joined to the side or top edge of the member 32, and the width of the framing to receive insulation would be limited to the width of a single member. It may be seen that the connector of the present invention effectively increases the width available to receive insulation by allowing the members to overlap, but while still supporting each other.

While the connector shown is especially useful in the framing of wood members in a building, many other applications are possible, regardless of size. Also, the ears 22 may be secured to any flat surface. Moreover, the channel and the ears could be shaped other than flat to enable joining of the connector to a variety of curved or angled surfaces.

In order to facilitate placement of the connector at the desired location, an opening 40 may be provided in the center of the end wall 14, which would enable the connector to be aligned with spaced or measured markings on the member.

Figure 7:
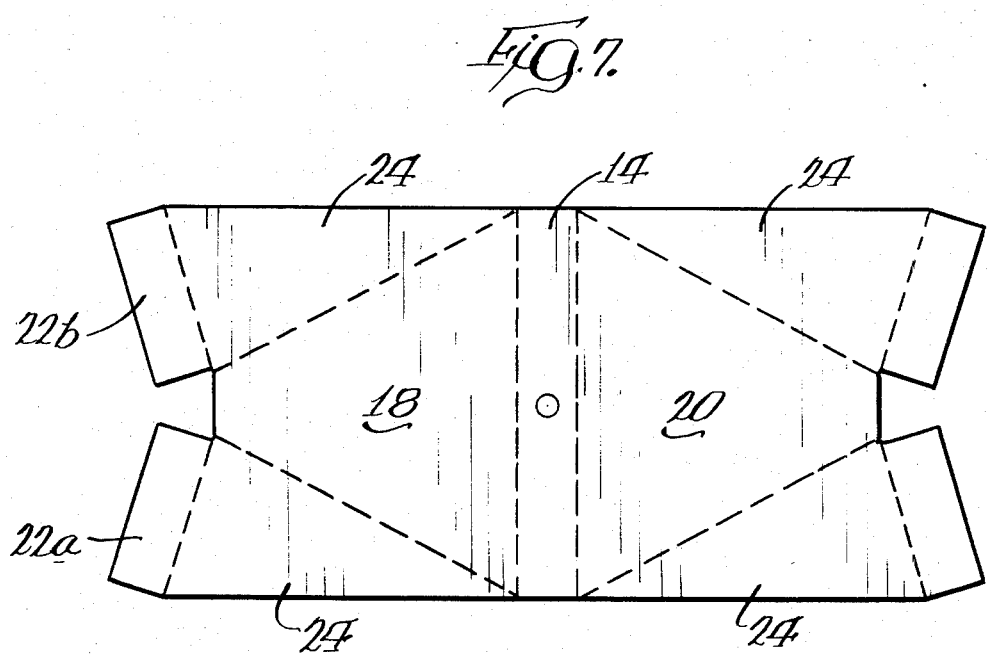
FIG. 7 is a plan view of a blank that may be used to fabricate the device shown in FIGS. 1-4.

FIG. 7 illustrates a blank of sheet metal having fold lines that may be used to fabricate the device of the present invention. It will be noted that the blank may be prepared from a generally rectangular sheet of material having straight, parallel side 70 and 72 and end tabs such as 22a and 22b that overlap when the blank is folded along the indicated dotted lines to provide a double thickness at the ears 22. The use of a rectangular blank results in the particular configuration shown in FIGS. 1 through 4 wherein the walls 24 diverge outwardly from the ears 22 to allow good access to the ears for making connections. Also, the use of a rectangular blank results in economics and less waste of materials in comparison with other blank shapes.

Figure 6:
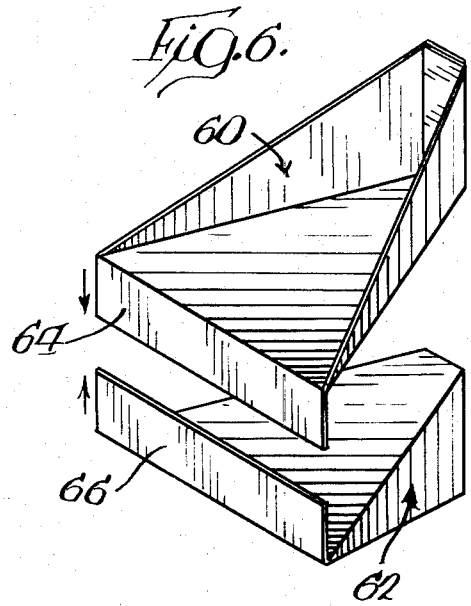
FIG. 6 is a perspective view of a connector device similar to the one shown in FIG. 1 and further illustrating a possible manner of construction from two identical parts.

In addition, the connector may be formed in two substantially identical halves 60 and 62 as shown in FIG. 6, with each half having its own end wall 64 and 66. The connector could be completed by joining the end walls 64 and 66 at the desired width, and then using the connector as described above.

I claim:

1. A connector for supporting a first member and a second member at right angles, said connector comprising a pair of spaced walls, an end wall connected between said spaced walls and defining an open channel for receiving said first member, a pair of attachment ears connected to and extending away from said spaced walls at the open end of said channel, said attachment ears having outwardly facing surfaces to abut the second member and to enable securement thereof to the second member, and pairs of spaced support webs connected between the side edges of the spaced walls and the attachment ears for reinforcing said ears.

2. The connector of claim 1 wherein said spaced walls are in the form of trapezoids.

3. The connector of claim 1 wherein said connector is made of two halves adapted to be joined at the end wall.

4. The connector of claim 1 wherein said ears are narrower than said end wall and the side edges of said spaced walls converge toward said ears.

5. The connector of claim 1 wherein said ears are coplanar.

6. The connector of claim 5 wherein said ears are parallel to said end wall.

7. The connector of claim 1 wherein said support web is in the form of a triangle extending between said spaced wall and the ear of said wall.

8. The connector of claim 1 further comprising a location opening in said end wall.

9. The connector of claim 1 wherein said connector is formed from a blank of generally rectangular sheet material.

* * * * *